(12) United States Patent
Chiang

(10) Patent No.: US 10,133,306 B2
(45) Date of Patent: Nov. 20, 2018

(54) MOUNTING DEVICES

(71) Applicant: RAZER (ASIA-PACIFIC) PTE. LTD., Singapore (SG)

(72) Inventor: Michael Chung-Ta Chiang, Emeryville, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/547,936

(22) PCT Filed: Feb. 2, 2015

(86) PCT No.: PCT/SG2015/000027
§ 371 (c)(1),
(2) Date: Aug. 1, 2017

(87) PCT Pub. No.: WO2016/126199
PCT Pub. Date: Aug. 11, 2016

(65) Prior Publication Data
US 2018/0024587 A1    Jan. 25, 2018

(51) Int. Cl.
| | | |
|---|---|---|
| G06F 1/16 | (2006.01) |
| H04M 1/04 | (2006.01) |
| F16B 2/10 | (2006.01) |
| H04M 1/05 | (2006.01) |
| F16M 13/04 | (2006.01) |
| F16B 2/00 | (2006.01) |

(52) U.S. Cl.
CPC .............. G06F 1/163 (2013.01); F16B 2/10 (2013.01); F16M 13/04 (2013.01); H04M 1/04 (2013.01); H04M 1/05 (2013.01); F16B 2/005 (2013.01)

(58) Field of Classification Search
CPC ............ G06F 1/163; F16B 2/10; F16B 2/005; H04M 1/05; H04M 1/04; H04M 1/11; F16M 11/40; F16M 11/242; F16M 11/2021; F16M 11/10; F16M 13/04
USPC ....... 248/122.1, 488, 448, 451, 346.07, 918, 248/924
See application file for complete search history.

(56) References Cited

U.S. PATENT DOCUMENTS 8,544,161 B2 * 10/2013 Carnevali ........... B60R 11/0235
248/346.04
9,176,325 B2 * 11/2015 Lyons ................ G02B 27/0172
(Continued)

FOREIGN PATENT DOCUMENTS

JP   2005-261535 A    9/2005
KR   20-0431126 Y1   11/2006
(Continued)

OTHER PUBLICATIONS

Extended European Search Report dated Aug. 21, 2018, 8 pages, from the European Patent Office, for the corresponding European Patent Application No. 15881333.7.

*Primary Examiner* — Christopher Garft

(57) ABSTRACT

According to various embodiments, a mounting device may be provided. The mounting device may include: a first arm, wherein the first arm is rotatable around an axis; a second arm, wherein the second arm is rotatable around the axis; wherein the first arm includes at least one first engagement member configured to engage with a further device; and wherein the second arm includes at least one second engagement member configured to engage with the further device.

21 Claims, 5 Drawing Sheets

(56) References Cited

U.S. PATENT DOCUMENTS

| | | |
|---|---|---|
| 2006/0186296 A1 | 8/2006 | Garceau |
| 2010/0079356 A1* | 4/2010 | Hoellwarth .......... G02B 27/017 345/8 |
| 2010/0203908 A1 | 8/2010 | Jeong et al. |
| 2012/0234055 A1* | 9/2012 | Bland, III .......... E05B 73/0082 70/15 |
| 2012/0317776 A1 | 12/2012 | Carnevali |
| 2013/0069969 A1 | 3/2013 | Chang et al. |
| 2013/0134267 A1* | 5/2013 | Liu ..................... F16M 11/10 248/122.1 |
| 2014/0123014 A1 | 5/2014 | Keen |
| 2014/0282083 A1 | 9/2014 | Gaetano, Jr. et al. |
| 2017/0187855 A1* | 6/2017 | Hoellwarth .......... G02B 27/017 |

FOREIGN PATENT DOCUMENTS

| | | |
|---|---|---|
| KR | 10-2011-0123630 A | 11/2011 |
| KR | 10-2012-0109710 A | 10/2012 |
| KR | 20-0467039 Y1 | 5/2013 |

* cited by examiner

MOUNTING DEVICES

TECHNICAL FIELD

Various embodiments generally relate to mounting devices.

BACKGROUND

Electronic devices may be used for various purposes. Thus, there may be a need for an effective mount for electronic devices.

SUMMARY OF THE INVENTION

According to various embodiments, a mounting device may be provided. The mounting device may include: a first arm, wherein the first arm is rotatable around an axis; a second arm, wherein the second arm is rotatable around the axis; wherein the first arm includes at least one first engagement member configured to engage with a further device; and wherein the second arm includes at least one second engagement member configured to engage with the further device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Electronic devices may be used for various purposes. According to various embodiments, an effective mount, for example for electronic devices, may be provided.

According to various embodiments, a mobile phone cover mount for a HMD (head mounted device) may be provided.

Figure 1A:
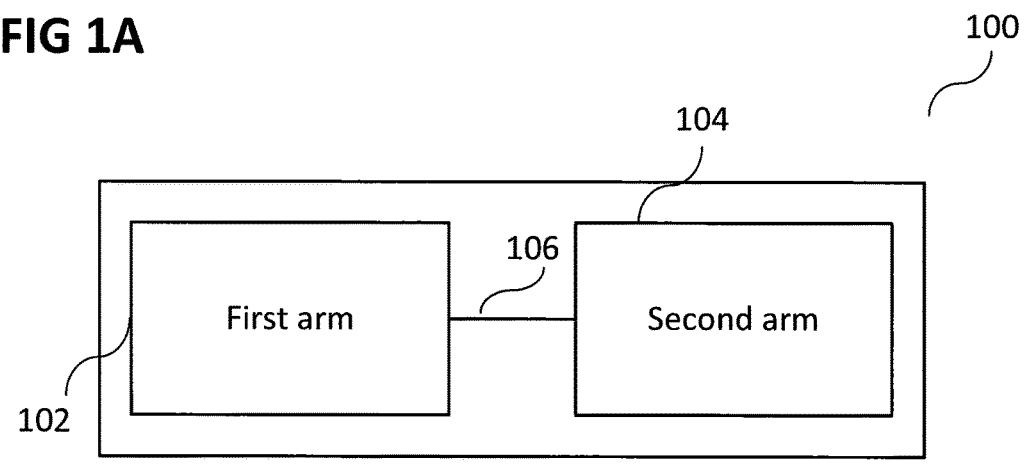
FIG. 1A shows a mounting device according to various embodiments.

FIG. 1A shows a mounting device 100 according to various embodiments. The mounting device 100 may include a first arm 102. The first arm 102 may be rotatable around an axis. The mounting device 100 may further include a second arm 104. The second arm 104 may be rotatable around the axis. The first arm 102 may include at least one first engagement member configured to engage with a further device. The second arm 104 may include at least one second engagement member configured to engage with the further device. The first arm 102 and the second arm 104 may be mechanically (but moveably against each other) connected, like illustrated by line 106.

In other words, a mounting device may include two arms which are rotatable around a common axis, and which may hold a further device.

According to various embodiments, the axis may be provided at least substantially in the middle of the first arm 102.

According to various embodiments, the axis may be provided at least substantially in the middle of the second arm 104.

According to various embodiments, a longitudinal elongation of the first arm 102 may be at least substantially orthogonal to the axis.

According to various embodiments, a longitudinal elongation of the second arm 104 may be at least substantially orthogonal to the axis.

According to various embodiments, the at least one first engagement member may be provided at least substantially at a distal portion of the first arm 102.

According to various embodiments, the first arm 102 may include two first engagement members.

According to various embodiments, two first engagement members may be provided at least substantially at opposing ends of the first arm 102.

According to various embodiments, the at least one second engagement member may be provided at least substantially at a distal portion of the second arm 104.

According to various embodiments, the second arm 104 may include two second engagement members.

According to various embodiments, two second engagement members may be provided at least substantially at opposing ends of the second arm 104.

According to various embodiments, the at least one first engagement member may include or may be made from a material with high friction when engaging to the further device.

According to various embodiments, the at least one first engagement member may include or may be made from a hard rubber grip.

According to various embodiments, the at least one first engagement member may have a conical shape. This may provide that the further device is forced into one direction (for example towards a portion of a housing) when mounted in the mounting device.

According to various embodiments, the at least one first engagement member may include or may be an indentation. This may provide that the further device is fixed when mounted in the mounting device.

According to various embodiments, the at least one second engagement member may include or may be made from a material with high friction when engaging to the further device.

According to various embodiments, the at least one second engagement member may include or may be made from a hard rubber grip.

According to various embodiments, the at least one second engagement member may have a conical shape.

According to various embodiments, the at least one second engagement member may include or may be an indentation.

Figure 1B:
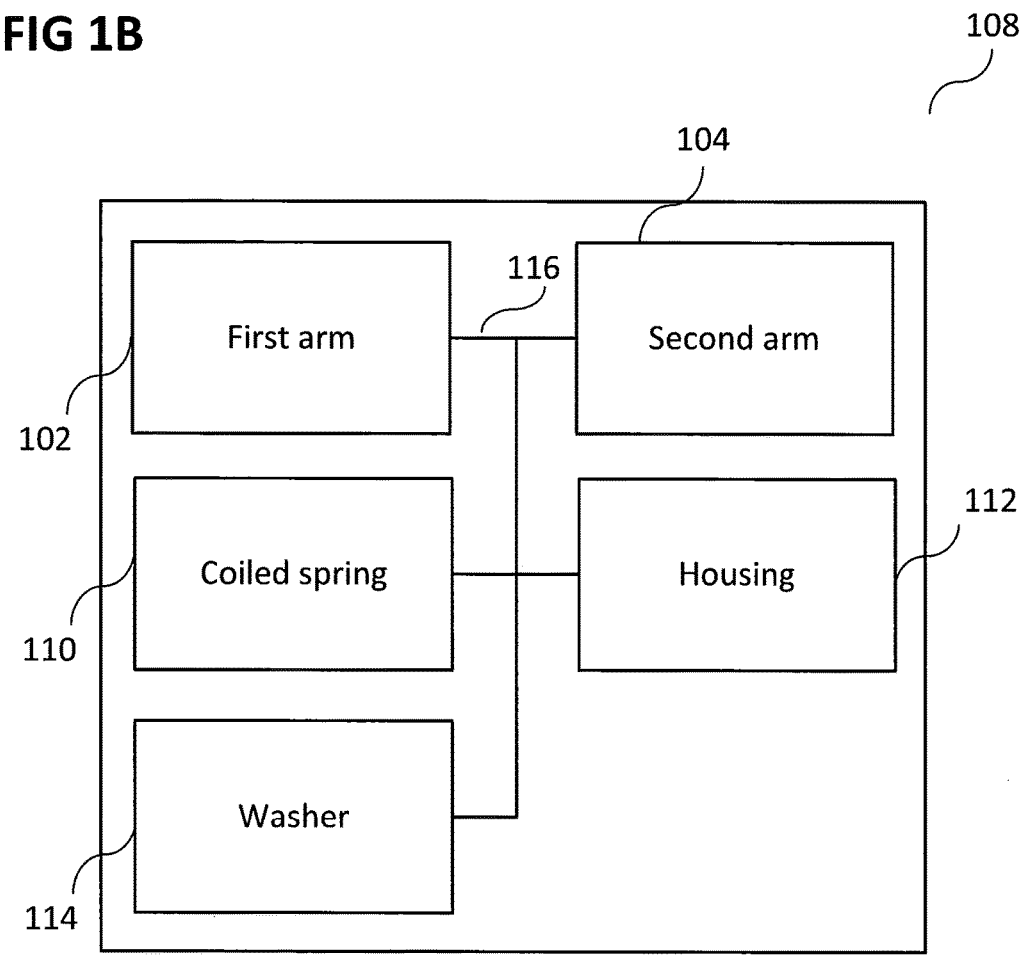
FIG. 1B shows a mounting device according to various embodiments.

FIG. 1B shows a mounting device 108 according to various embodiments. The mounting device 108 may, similar to the mounting device 100 of FIG. 1A, include a first arm 102. The first arm 102 may be rotatable around an axis. The mounting device 108 may, similar to the mounting device 100 of FIG. 1A, further include a second arm 104. The second arm 104 may be rotatable around the axis. The first arm 102 may include at least one first engagement member configured to engage with a further device. The second arm 104 may include at least one second engagement member configured to engage with the further device. The mounting device 108 may further include a coiled spring 110, like will be described in more detail below. The mounting device 108 may further include a housing 112, like will be described in more detail below. The mounting device 108 may further include a washer 114, like will be described in more detail below. The first arm 102, the second arm 104, the coiled spring 110, the housing 112, and the washer 114 may be mechanically connected, like illustrated by lines 116.

According to various embodiments, the coiled spring 110 may be configured to force the at least one first engagement member and the at least one second engagement member towards each other.

According to various embodiments, a length of the first arm 102 may be so that no buttons of the further device are touched by the at least one first engagement member when the further device is mounted by the mounting device 108.

According to various embodiments, a length of the second arm may be so that no buttons of the further device are touched by the at least one second engagement member when the further device is mounted by the mounting device 108.

According to various embodiments, the further device may be an electronic device.

According to various embodiments, the further device may be a mobile radio communication device.

According to various embodiments, the further device may be a mobile phone.

According to various embodiments, the housing 112 may include a thread configured to receive a screw. The screw may be a part of the mounting device 108. The screw may define the axis.

According to various embodiments, the first arm 102 and the second arm 104 may be attached to the housing 112 using the screw.

According to various embodiments, the washer 114 may be provided between the first arm 102 and the screw.

According to various embodiments, the housing 112 may be a housing of a head mounted display.

Figure 2:
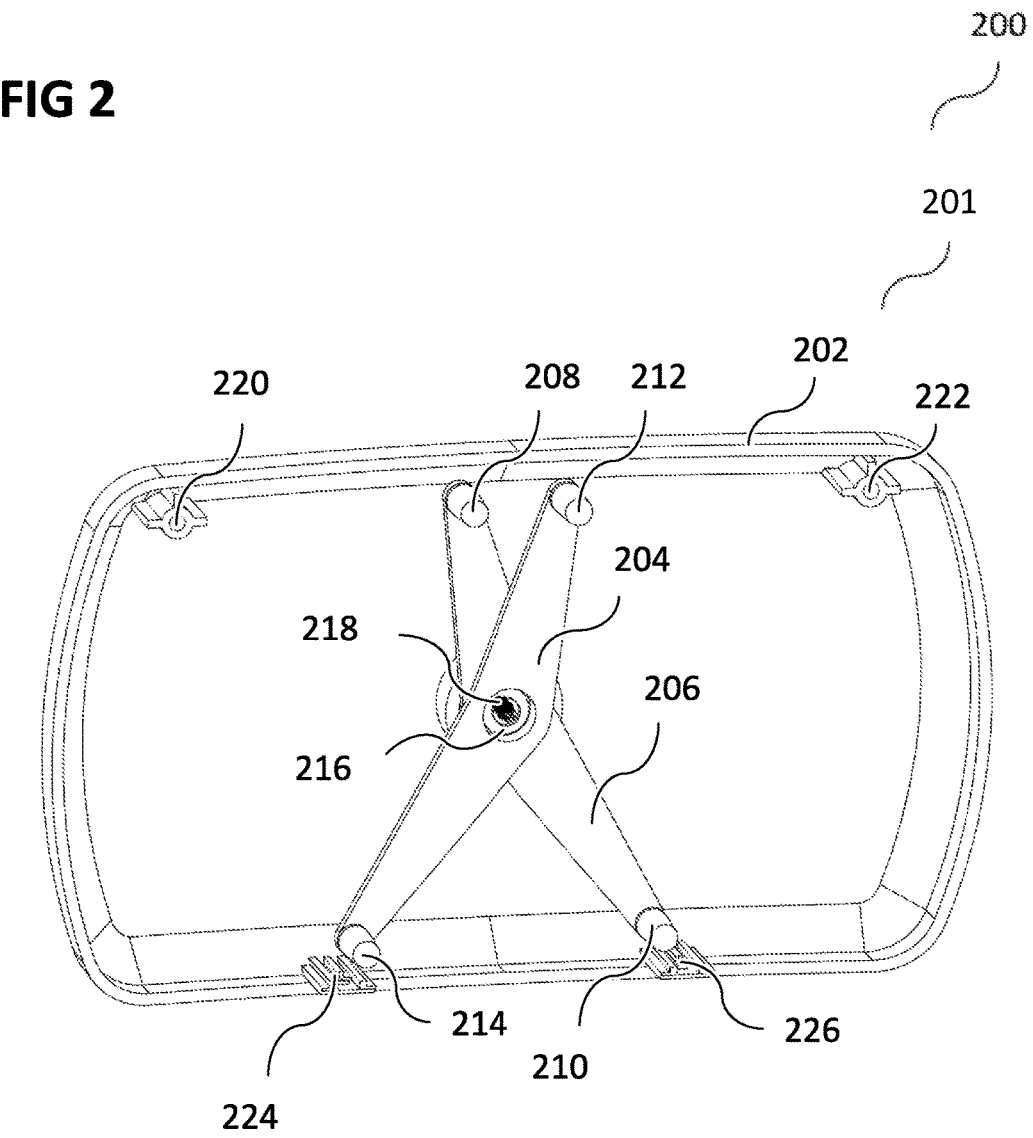
FIG. 2 shows a mounting device according to various embodiments.

FIG. 2 shows an illustration 200 of a mounting device (for example a mobile phone cover mount for an HMD 201) according to various embodiments. The mount is used to hold a mobile phone as the display in the HMD 201 instead of a separate display and PCBA (printed circuit board assembly). A first portion 202 of a housing, arms (for example a first arm 204 and a second arm 206; for example scissor arms (which for example may be made from Polyoxymethylene (POM), which is a self-lubricating plastic resin), engagement members (for example first engagement members 212 and 214 of the first arm 204, and second engagement members 208 and 210 of the second arm 206, for example hard rubber grips), a washer 216, a screw 218, and portions 220, 222, 224, and 226 for attaching a further portion of the housing to the first portion 202 of the housing may be provided.

According to various embodiments, the arms 204, 206 (for example scissor arms) may be provided for catering for different sized mobile phones. According to various embodiments, the angle (and/or the length) of the scissor arms may be arranged specifically such that it will not contact the buttons on the sides of the targeted mobile phones.

According to various embodiments, the mounting device may include a coiled spring (not shown in FIG. 2). The coiled spring may for example be provided in the axis, for example engaging to the first arm 204 and the second arm 206, and may force the first engagement members and the second engagement members towards each other so as to hold a further device (for example an electronic device, for example a mobile phone) in the mounting device between the first engagement members and second engagement members.

Figure 3A:
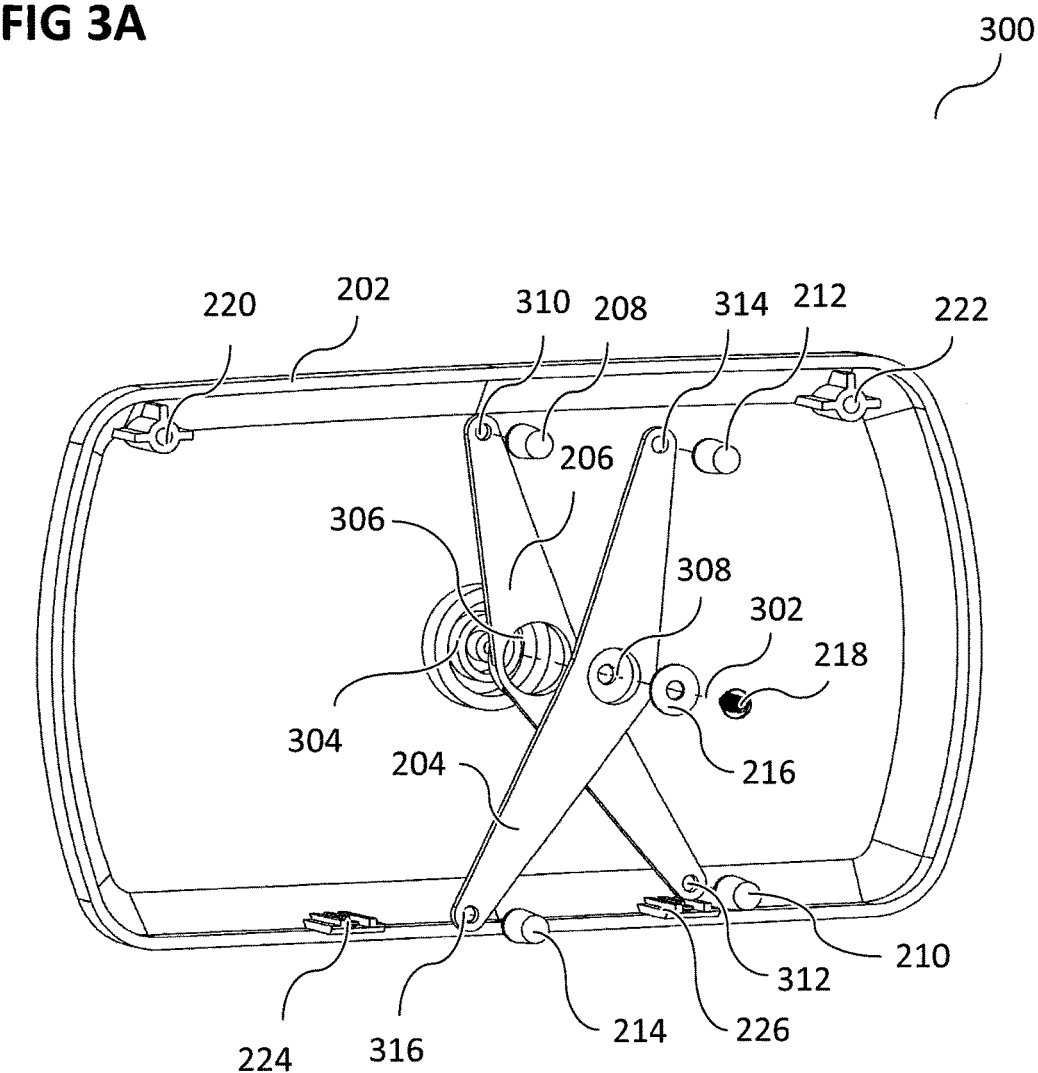
FIG. 3A shows a mounting device according to various embodiments.

FIG. 3A shows an illustration 300 of an exploded view of a mounting device (for example a mobile phone cover mount for an HMD) according to various embodiments. Various portions of the mounting device shown in illustration 300 of FIG. 3A may be similar or identical to the mounting device shown in illustration 200 of FIG. 2, so that the same reference signs may be used and duplicate description may be omitted. The first arm 204 and the second arm 206 may rotate around the axis 302. A corresponding axis recession 304 may be provided in the first portion 202 of the housing. The first arm 204 may include a hole 308 and the second arm 206 may include a hole 306 at the portion of the axis 302. The first arm 204 may include further holes 314 and 316 for receiving the first engagement members 212 and 214. The second arm 206 may include further holes 310 and 312 for receiving the second engagement members 208 and 210.

According to various embodiments, the distances of the engagement members of the first arm 204 and the second arm 206 to the axis 302 may be pairwise at least substantially equal. For example the distance between the mounting member 208 and the axis 302 may be at least substantially equal to the distance between the mounting member 212 and the axis 302; furthermore, the distance between the mounting member 210 and the axis 302 may be at least substantially equal to the distance between the mounting member 214 and the axis 302 This may ensure that the further device may always be mounted in an orientation which is at least substantially horizontal with respect to a horizontal axis (in other word: length axis) of the mounting device, independent from the size of the further device.

According to various embodiments, the distances of the engagement members of the first arm 204 and the second arm 206 to the axis 302 may be at least substantially equal. For example the distance between the mounting member 208 and the axis 302 may be at least substantially equal to the distance between the mounting member 212 and the axis 302, may be at least substantially equal to the distance between the mounting member 210 and the axis 302, and may be at least substantially equal to the distance between the mounting member 214 and the axis 302 This may ensure that the further device may always be mounted centered with respect to the mounting device (for example centered with respect to the axis 302), independent from the size of the further device.

Figure 3B:
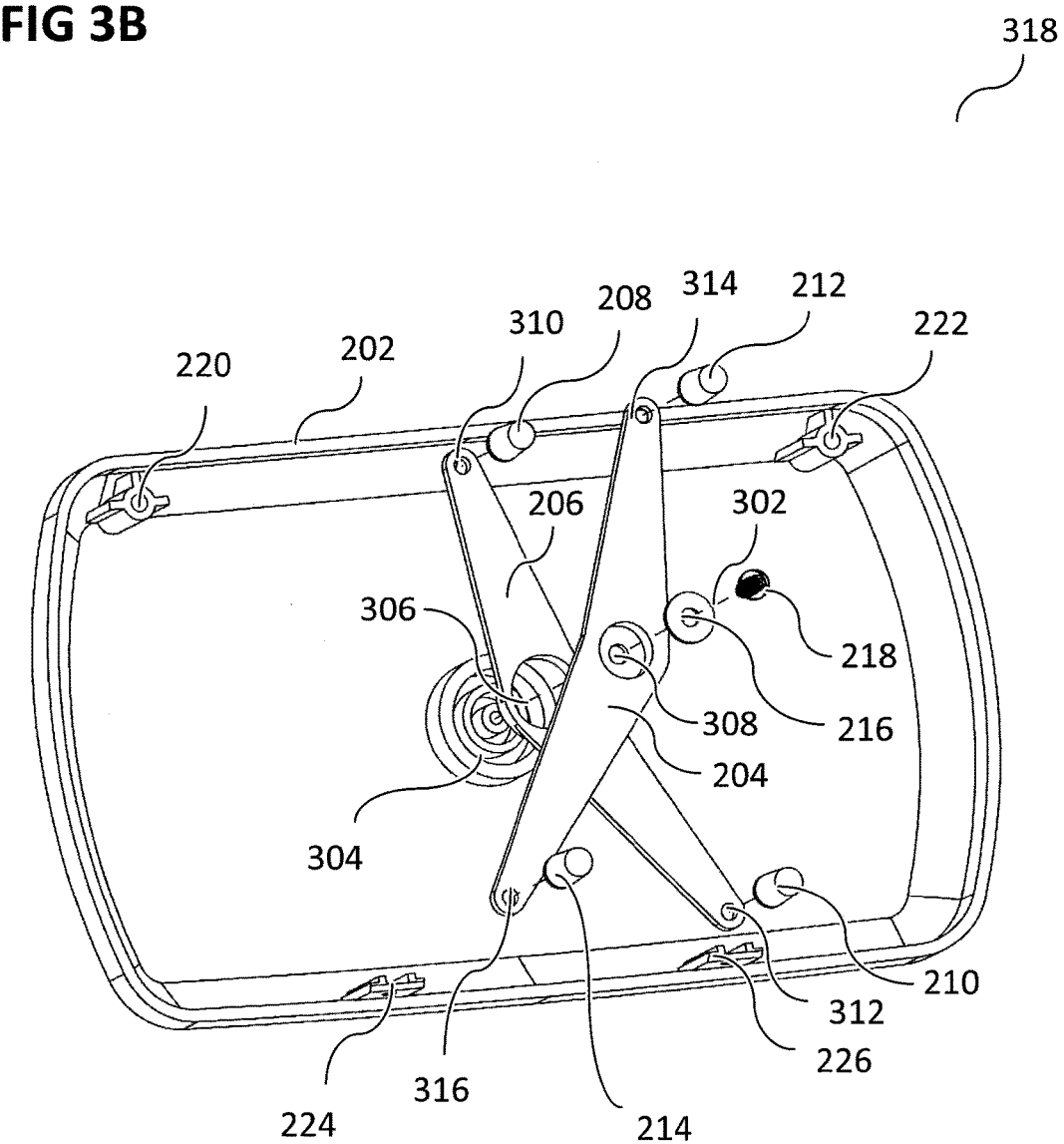
FIG. 3B shows a mounting device according to various embodiments.
Figure 4:
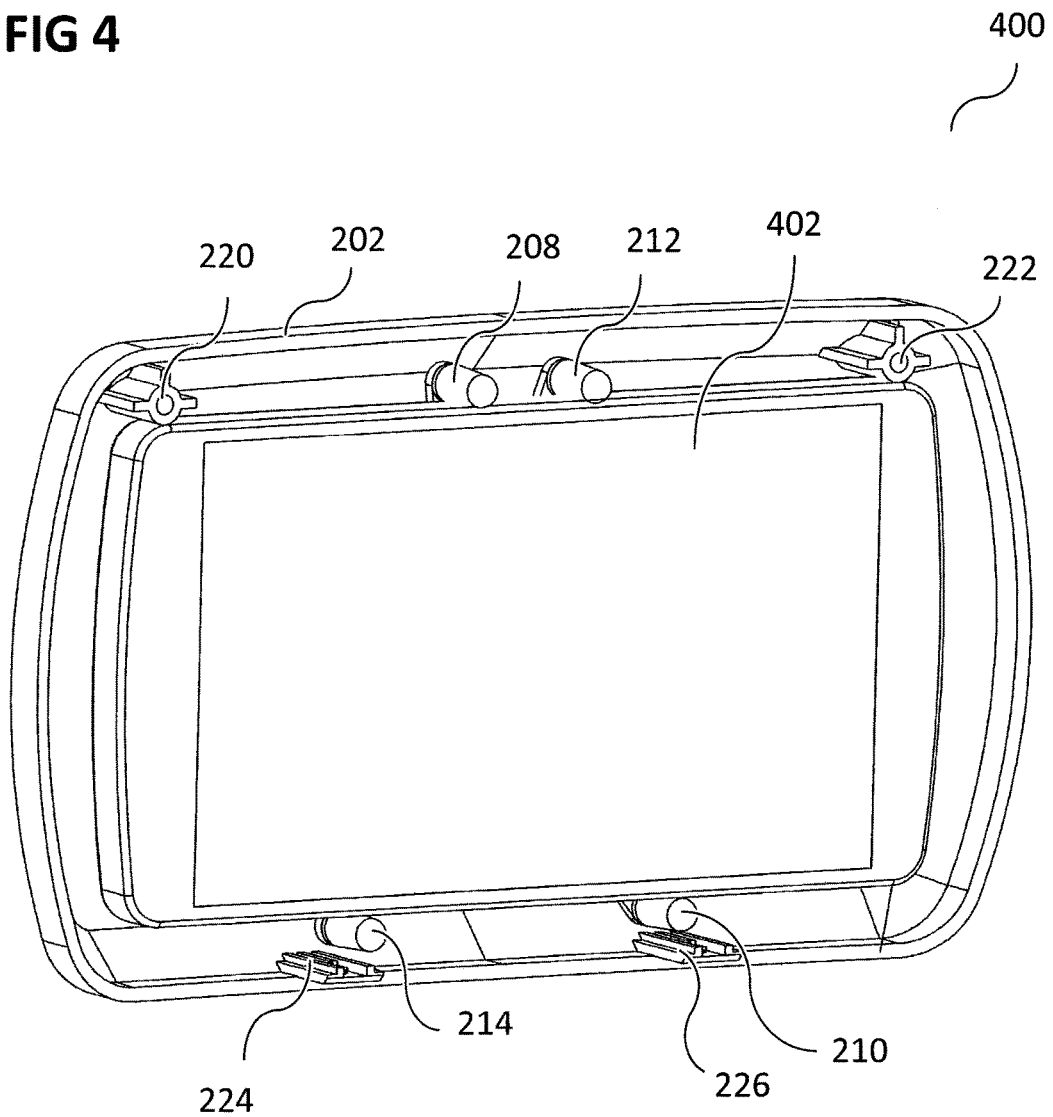
FIG. 4 shows a mounting device according to various embodiments.

FIG. 3B shows an illustration 318 of an exploded view of a mounting device (for example a mobile phone cover mount for an HMD) according to various embodiments. Various portions of the mounting device shown in illustration 318 of FIG. 3B may be similar or identical to the mounting device shown in illustration 200 of FIG. 2 and/or may be similar or identical to the mounting device shown in illustration 300 of FIG. 3A, so that the same reference signs may be used and duplicate description may be omitted. FIG. 4 shows an illustration 400 of a mounting device (for example a mobile phone cover mount for an HMD) according to various embodiments. Various portions of the mounting device shown in illustration 400 of FIG. 4 may be similar or identical to the mounting device shown in illustration 200 of FIG. 2, so that the same reference signs may be used and duplicate description may be omitted.

A further device 402, for example an electronic device, for example a mobile phone, is shown mounted in the mounting device.

By having an arrangement of the mounting device with scissor arms as described above according to various embodiments, it may be ensured that, independent of the size of the further device, the further device may always be mounted in the center of the mounting device. Furthermore, the mounting device may ensure that the further device may always be mounted in an orientation which is at least substantially horizontal with respect to a horizontal axis (in other word: length axis) of the mounting device. It will be understood that the centering and horizontal orientation of the further device when mounted in the mounting device may be provided for further devices (for example mobile phones) which have an at least substantially rectangular cross-section in a plane parallel to a screen of the further device.

The following examples pertain to further embodiments.

Example 1 is a mounting device comprising: a first arm, wherein the first arm is rotatable around an axis; a second arm, wherein the second arm is rotatable around the axis; wherein the first arm comprises at least one first engagement member configured to engage with a further device; and wherein the second arm comprises at least one second engagement member configured to engage with the further device.

In example 2, the subject-matter of example 1 can optionally include that the axis is provided at least substantially in the middle of the first arm.

In example 3, the subject-matter of any one of examples 1 to 2 can optionally include that the axis is provided at least substantially in the middle of the second arm.

In example 4, the subject-matter of any one of examples 1 to 3 can optionally include that a longitudinal elongation of the first arm is at least substantially orthogonal to the axis.

In example 5, the subject-matter of any one of examples 1 to 4 can optionally include that a longitudinal elongation of the second arm is at least substantially orthogonal to, the axis.

In example 6, the subject-matter of any one of examples 1 to 5 can optionally include that the at least one first engagement member is provided at least substantially at a distal portion of the first arm.

In example 7, the subject-matter of any one of examples 1 to 6 can optionally include that the first arm comprises two first engagement members.

In example 8, the subject-matter of example 7 can optionally include that two first engagement members are provided at least substantially at opposing ends of the first arm.

In example 9, the subject-matter of any one of examples 1 to 8 can optionally include that the at least one second engagement member provided at least substantially at a distal portion of the second arm.

In example 10, the subject-matter of any one of examples 1 to 9 can optionally include that the second arm comprises two second engagement members.

In example 11, the subject-matter of any one of examples 1 to 10 can optionally include that two second engagement members are provided at least substantially at opposing ends of the second arm.

In example 12, the subject-matter of any one of examples 1 to 11 can optionally include that the at least one first engagement member comprises a material with high friction when engaging to the further device.

In example 13, the subject-matter of any one of examples 1 to 12 can optionally include that the at least one first engagement member comprises a hard rubber grip.

In example 14, the subject-matter of any one of examples 1 to 13 can optionally include that the at least one first engagement member comprises a conical shape.

In example 15, the subject-matter of any one of examples 1 to 14 can optionally include that the at least one first engagement member comprises an indentation.

In example 16, the subject-matter of any one of examples 1 to 15 can optionally include that the at least one second engagement member comprises a material with high friction when engaging to the further device.

In example 17, the subject-matter of any one of examples 1 to 16 can optionally include that the at least one second engagement member comprises a hard rubber grip.

In example 18, the subject-matter of any one of examples 1 to 17 can optionally include that the at least one second engagement member comprises a conical shape.

In example 19, the subject-matter of any one of examples 1 to 18 can optionally include that the at least one second engagement member comprises an indentation.

In example 20, the subject-matter of any one of examples 1 to 19 can optionally include a coiled spring configured to force the at least one first engagement member and the at least one second engagement member towards each other.

In example 21, the subject-matter of any one of examples 1 to 20 can optionally include that a length of the first arm is so that no buttons of the further device are touched by the at least one first engagement member when the further device is mounted by the mounting device In example 22, the subject-matter of any one of examples 1 to 21 can optionally include that a length of the second arm is so that no buttons of the further device are touched by the at least one second engagement member when the further device is mounted by the mounting device.

In example 23, the subject-matter of any one of examples 1 to 22 can optionally include that the further device is an electronic device.

In example 24, the subject-matter of any one of examples 1 to 23 can optionally include that the further device is a mobile radio communication device.

In example 25, the subject-matter of any one of examples 1 to 24 can optionally include that the further device is a mobile phone.

In example 26, the subject-matter of any one of examples 1 to 25 can optionally include a housing.

In example 27, the subject-matter of example 26 can optionally include that the housing comprises a thread configured to receive a screw, the screw defining the axis.

In example 28, the subject-matter of example 27 can optionally include that the first arm and the second arm are attached to the housing using the screw.

In example 29, the subject-matter of any one of examples 1 to 28 can optionally include a washer between the first arm and the screw.

In example 30, the subject-matter of any one of examples 26 to 28 can optionally include that the housing is a housing of a head mounted display.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A head mounted display device comprising:
   a housing; and
   a mounting device configured to mount a further device in the housing, the mounting device comprising:
     a first arm, wherein the first arm is rotatable around an axis;
     a second arm, wherein the second arm is rotatable around the axis;
     wherein the first arm comprises at least one first engagement member configured to engage with the further device;
     wherein the second arm comprises at least one second engagement member configured to engage with the further device;
     wherein the mounting device further comprises a coiled spring provided in the axis and engaging to the first arm and the second arm;
     wherein the coiled spring is configured to force the at least one first engagement member and the at least one second engagement member towards each other; and
     wherein an angle between the first and second arms on one side of the axis is smaller than an opposing angle between the first and second arms on an opposite side of the axis when the first engagement member and the second engagement member engage with the further device.

2. The head mounted display device of claim 1, wherein the axis is provided at least substantially in the middle of the first arm or the second arm.

3. The head mounted display device of claim 1, wherein a longitudinal elongation of the first arm or the second arm is at least substantially orthogonal to the axis.

4. The head mounted display device of claim 1, wherein the at least one first engagement member is provided at least substantially at a distal portion of the first arm.

5. The head mounted display device of claim 1, wherein the first arm comprises two first engagement members.

6. The head mounted display device of claim 5, wherein the two first engagement members are provided at least substantially at opposing ends of the first arm.

7. The head mounted display device of claim 1, wherein the at least one second engagement member is provided at least substantially at a distal portion of the second arm.

8. The head mounted display device of claim 1, wherein the second arm comprises two second engagement members.

9. The head mounted display device of claim 8, wherein the two second engagement members are provided at least substantially at opposing ends of the second arm.

10. The head mounted display device of claim 1, wherein the at least one first engagement member comprises a material with high friction when engaging to the further device.

11. The head mounted display device of claim 1, wherein the at least one first engagement member comprises at least one of a conical shape or an indentation.

12. The head mounted display device of claim 1, wherein the at least one second engagement member comprises at least one of a material with high friction when engaging to the further device, a conical shape, or an indentation.

13. The head mounted display device of claim 1, wherein a length of the first arm is so that no buttons of the further device are touched by the at least one first engagement member when the further device is mounted by the mounting device.

14. The head mounted display device of claim 1, wherein a length of the second arm is so that no buttons of the further device are touched by the at least one second engagement member when the further device is mounted by the mounting device.

15. The head mounted display device of claim 1, wherein the further device is at least one of an electronic device, a mobile radio communication device, or a mobile phone.

16. The head mounted display device of claim 1,
wherein the housing comprises a thread configured to receive a screw, the screw defining the axis.

17. The head mounted display device of claim 16,
wherein the first arm and the second arm are attached to the housing using the screw.

18. The head mounted display device of claim 16, further comprising:
a washer between the first arm and the screw.

19. The head mounted display device of claim 1,
wherein the at least one first engagement member comprises at least one of a conical shape; and
wherein the at least one of a conical shape tapers away from the first arm.

20. The head mounted display device of claim 1,
wherein the at least one second engagement member comprises at least one of a conical shape; and
wherein the at least one of a conical shape tapers away from the second arm.

21. The head mounted display device of claim 1,
wherein the first and second arms are made from Polyoxymethylene.

\* \* \* \* \*